(12) United States Patent
Atkinson

(10) Patent No.: US 11,150,475 B2
(45) Date of Patent: Oct. 19, 2021

(54) TRANSFER TO HEAD MOUNTED DISPLAY

(71) Applicant: HEWLETT-PACKARD DEVELOPMENT COMPANY, L.P., Houston, TX (US)

(72) Inventor: Lee Atkinson, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 641 days.

(21) Appl. No.: 16/076,501

(22) PCT Filed: Apr. 12, 2017

(86) PCT No.: PCT/US2017/027200
§ 371 (c)(1),
(2) Date: Aug. 8, 2018

(87) PCT Pub. No.: WO2018/190826
PCT Pub. Date: Oct. 18, 2018

(65) Prior Publication Data
US 2021/0199964 A1 Jul. 1, 2021

(51) Int. Cl.
*G02B 27/01* (2006.01)
*H04N 13/344* (2018.01)

(52) U.S. Cl.
CPC ......... *G02B 27/017* (2013.01); *H04N 13/344* (2018.05); *G02B 2027/0178* (2013.01)

(58) Field of Classification Search
CPC .......... G02B 27/017; G02B 2027/0178; H04N 13/344
See application file for complete search history.

(56) References Cited

U.S. PATENT DOCUMENTS

| | | | |
|---|---|---|---|
| 7,614,011 B2 | 11/2009 | Karidis et al. | |
| 8,130,261 B2 | 3/2012 | Trudeau et al. | |
| 8,665,177 B2 | 3/2014 | Herrmann et al. | |
| 9,025,252 B2 | 5/2015 | Lewis et al. | |
| 9,118,875 B2 | 8/2015 | Ida | |
| 9,443,355 B2 | 9/2016 | Chan et al. | |
| 9,606,363 B2 | 3/2017 | Zalewski | |
| 10,297,077 B1* | 5/2019 | Vlachos | G06T 15/30 |
| 10,950,305 B1* | 3/2021 | Seiler | G09G 5/39 |
| 2002/0030888 A1 | 3/2002 | Kleinberger et al. | |
| 2004/0150745 A1* | 8/2004 | Aiba | H04N 11/042 348/441 |
| 2010/0156914 A1* | 6/2010 | Endo | G09G 3/20 345/522 |
| 2011/0194029 A1* | 8/2011 | Herrmann | H04N 13/398 348/569 |

(Continued)

FOREIGN PATENT DOCUMENTS

TW 201634974 A 10/2016

OTHER PUBLICATIONS

Gerd et al., "Estimation of Virtual Interpupillary Distances for Immersive Head-Mounted Displays", Experiment-Head-Mounted Displays, Interpupillary Distance, Jul. 23-24, 2010, p. 168.

*Primary Examiner* — Dmitriy Bolotin
(74) *Attorney, Agent, or Firm* — HPI Patent Department

(57) ABSTRACT

A system and method for an HMD system including an HMD and a computing device. The computing device to render an image for the HMD, and transfer the image to the HMD without inactive pixels of the image. The inactive pixels include pixels outside of a viewable area of the image.

10 Claims, 13 Drawing Sheets

(56) References Cited

U.S. PATENT DOCUMENTS

| | | | |
|---|---|---|---|
| 2012/0068913 A1* | 3/2012 | Bar-Zeev | G02B 27/0172 345/8 |
| 2012/0086707 A1* | 4/2012 | Li | H04N 13/337 345/419 |
| 2013/0147797 A1* | 6/2013 | Tanaka | G06T 15/00 345/419 |
| 2014/0104143 A1 | 4/2014 | Benson et al. | |
| 2014/0274391 A1 | 9/2014 | Stafford | |
| 2014/0361977 A1 | 12/2014 | Stafford et al. | |
| 2014/0375540 A1 | 12/2014 | Ackerman et al. | |
| 2015/0287165 A1 | 10/2015 | Berghoff | |
| 2016/0018647 A1 | 1/2016 | Osterhout et al. | |
| 2016/0189429 A1 | 6/2016 | Mallinson | |
| 2017/0316607 A1* | 11/2017 | Khalid | G02B 27/0172 |
| 2018/0144682 A1* | 5/2018 | Tao | G09G 3/3233 |
| 2018/0253868 A1* | 9/2018 | Bratt | G06F 3/012 |
| 2020/0288114 A1* | 9/2020 | Lakshman | H04N 13/344 |

* cited by examiner

100

1100

1200

TRANSFER TO HEAD MOUNTED DISPLAY

BACKGROUND

A head-mounted display (HMD) may be a display device worn on the head of a user. A typical HMD may have one or two small displays with lenses. An HMD system may generally include a computing device that renders images for the HMD. The computing device may be coupled to the HMD via a link such as a cable or wireless connection. The rendered image may be transferred from the computing device to the HMD over the link for display on the HMD.

BRIEF DESCRIPTION OF THE DRAWINGS

Certain examples are described in the following detailed description and in reference to the drawings, in which.

DETAILED DESCRIPTION OF SPECIFIC EXAMPLES

The transfer of image data from a rendering computer to a head mounted display (HMD) may employ significant bandwidth across the link (e.g., cable) communicatively coupling the rendering computer to the HMD. Thus, the link may limit the amount of image data that can be transferred from the rendering computer to the HMD. In some cases, such may lower image quality and action consistency, and the like. Moreover, power consumption, thermal performance, and efficiency may be adversely affected. The transfer may involve relatively large amounts of image data from the rendering computing device to the HMD.

In response, certain examples of the present techniques are directed to the transfer of image data from an image-rendering computing device to a HMD such as over a cable, wireless connection, or other link. In particular, the technique may reduce the amount of image data or the amount of bandwidth (e.g., link rate) of the transfer such as by not transferring inactive pixels or inactive pixel data. Thus, in some examples, the link rate or bandwidth employed across a data transport (e.g., cable, wireless transmitter, etc.) between a video renderer (a computer) and an HMD may be reduced by not transferring "inactive pixels" such as pixels outside of the viewable area of the image.

As discussed below, some options involve to not send the blanking position (i.e., a period of inactive pixel data) related to adjustment for interpupillary distance (IPD) of the HMD user. Instead, for example, active processing may reposition the image (e.g., horizontally) on the HMD display as a function of the desired IPD. Such processing in certain examples may be performed by the computer display controller (e.g., a graphics processing unit or GPU) of the rendering computing device, and/or by the HMD timing controller, and the like. Further, the HMD timing controller may physically offset the start column of the viewable image on the display. Therefore, in examples, the source (e.g., the rendering computer) may send only the viewable image over the cable or wireless connection and omit sending blank positioning.

As also discussed below, additional options to reduce bandwidth employed in the transfer may involve to not send inactive pixels that are pixels outside the boundary of a stencil mesh associated with the HMD. The display controller or graphics controller (the source) and the HMD timing controller (the sink) may work in conjunction to transfer only pixels inside the stencil mesh boundary. Yet other options may include to combine the aforementioned options. Additional variations may be applicable.

Figure 1:
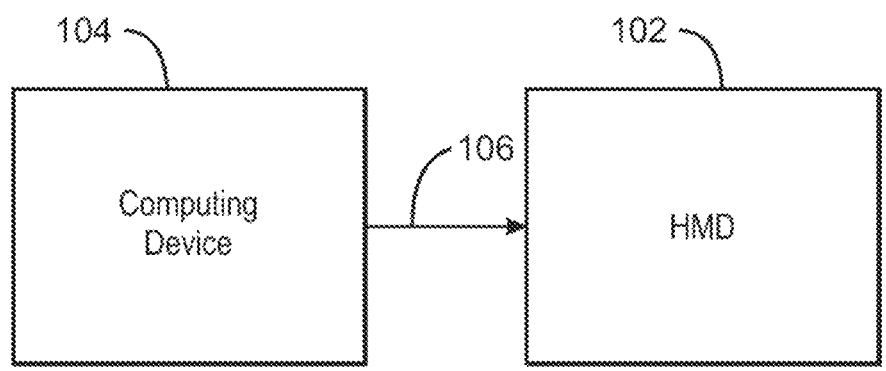
FIG. 1 is a diagram of an HMD system having an HMD and an associated computing device in accordance with examples.

FIG. 1 is a HMD system 100 having a HMD 102 and an associated computing device 104. An HMD 102 may be a display device worn on the head or as part of a helmet, and that has optics in front of one eye (monocular HMD) or each eye (binocular HMD). Typically, an HMD 102 may have one or more displays and lenses embedded in eyeglasses, a visor, or a helmet, and the like. An HMD system 100 may include applications in gaming, aviation, engineering, medicine, virtual reality (VR), and so on. The HMD system 100 may provide for the stereoscopic (3D) transfer of images from the computing device 104 to a stereoscopic HMD 102.

The HMD system 100 may include the computing device 104 to render the image for the HMD 102, and for other processing. In certain examples, the computing device 104 may be labeled as a rendering computer in the HMD system 100. In operation, the computing device 104 may transfer the rendered image to the HMD 102, as indicated by reference numeral 106. This link or coupling 106 of the computing device 104 to the HMD 102 may be wired (e.g., cable) or wireless (e.g., Wi-Fi). The HMD 102 may display the image to be viewed by a user wearing or otherwise employing the HMD 102.

As discussed below, the computing device 104 may identify inactive pixels of the rendered image. Further, the computing device 104 may transfer the image to the HMD 102 without the inactive pixels and thus save bandwidth across the link 106. In some examples, both the computing device 104 and the HMD 102 may be involved in active processing to account for positioning of the image on displays of the HMD 102 without the inactive pixels.

Figure 2:
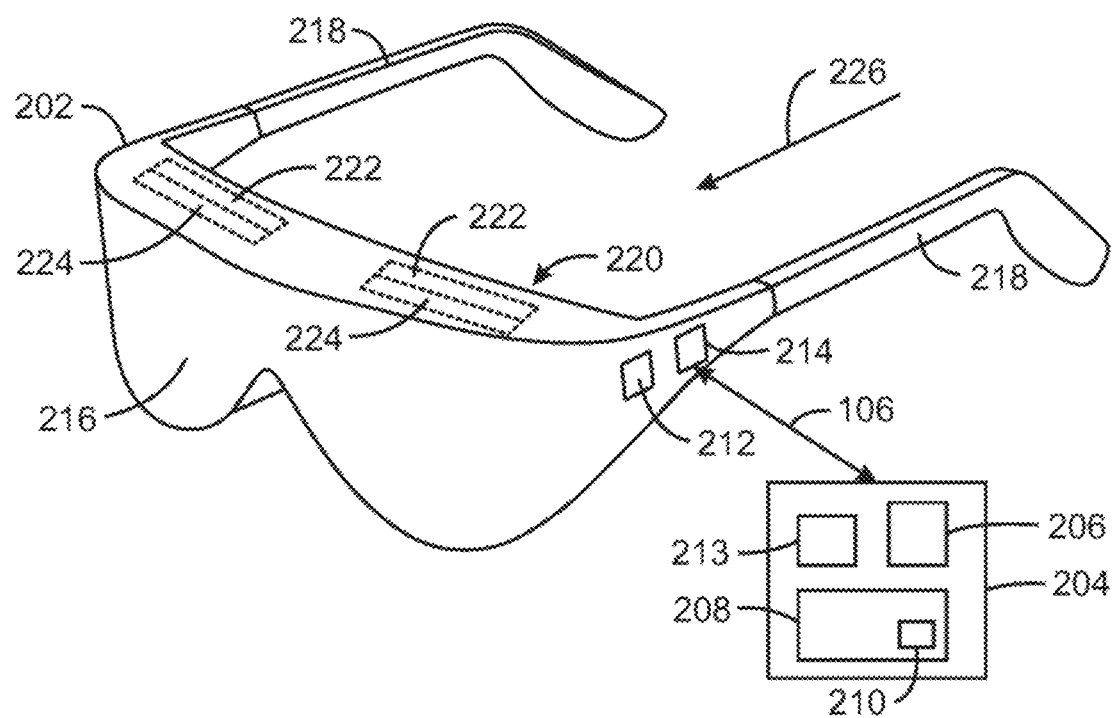
FIG. 2 is a diagram of an HMD system having an HMD and a computing device in accordance with examples.

FIG. 2 is an HMD system 200 having an HMD 202 and a computing device 204. In operation, the HMD 202 may be coupled with the computing device 204 via a link 106. The link 106 may be wired or wireless. The computing device 206 may be a rendering computing device which renders images and transfers the image data over the link 106 to the HMD 202 for display by the HMD 202.

The computing device 204 may include multiple hardware processors 206 such as a display controller or graphic processing unit (GPU), central processing unit (CPU), and so on. The computing device 204 may include memory 208 which stores code 210 (e.g., Instructions, logic, etc.) executed by the one or more processors 206. The code 210 when executed may direct the computing device 204 to implement technique described herein such as identifying inactive pixels of the image and transferring the image without the inactive pixel data to the HMD 202. The HMD 202 may also include a processor 212 such as an HMD timing controller or other processor. The computing device 204 may include an adapter 213 to facilitate coupling of the computing device 204 to the HMD 202 which may have a mating adapter 214. The adapters 213 and 214 may accommodate wired or wireless connections.

The memory 208 in the computing device 204 may include non-volatile memory, volatile memory, and other types of memory. The nonvolatile memory may be a hard drive, read-only-memory or ROM, etc. The volatile memory may be random access memory or RAM, cache, etc. Also, the computing device 204 may include an application-specific integrated circuit (ASIC) customized for techniques described.

The depicted HMD 202 has the general shape of eyewear to affix to the head of a user. However, it should be emphasized that the HMD 202 could be other forms such as a helmet, visor, or other structure to place the HMD 202 adjacent the eyes of a user. In the illustrated example, the HMD 202 has a front surface 216. Further, the HMD 202 has side portions or temples 218 to run along the sides of a head of user and engage the ears of the user to facilitate securing of the HMD 202 to the head of the user. The surface 220 is to face the eyes of the user and includes, embeds, or encompasses optics 222 (e.g., lenses, etc.) and displays 224. The display units of the displays 224 may include cathode ray tubes (CRT), liquid crystal displays (LCDs), liquid crystal on silicon (LCos), organic light-emitting diodes (OLED), and so forth. Again, the eyes of the user may face the surface 220 and displays 224, as indicated by arrow 226.

In operation, the computing device 204 may render an image for the HMD 202 to display the image on the displays 224. The computing device 204 via executed code 106 may identify inactive pixels of the rendered image. Further, the computing device 104 may transfer the image to the HMD 102 without the inactive pixels and thus save bandwidth across the link 106. In some examples, both the computing device 204 and the HMD 102 via the processor 212 may implement active processing to facilitate positioning of the image on the displays 224 without the inactive pixels.

These techniques may decrease the link rate (bandwidth) used across a data transport (e.g., a cable or wireless transmitter) between a video renderer (a computer) and a HMD by reducing the transfer of inactive pixels (e.g., pixels that are outside the viewable area of the image). In some examples, benefits may be implemented with (1) an HMD that employs software adjustable positioning for IPD adjustment, and/or (2) an HMD that relies on the host or rendering computer for correction of optical distortion or abandon pixels outside a viewable area, and other implementations.

Figure 3:
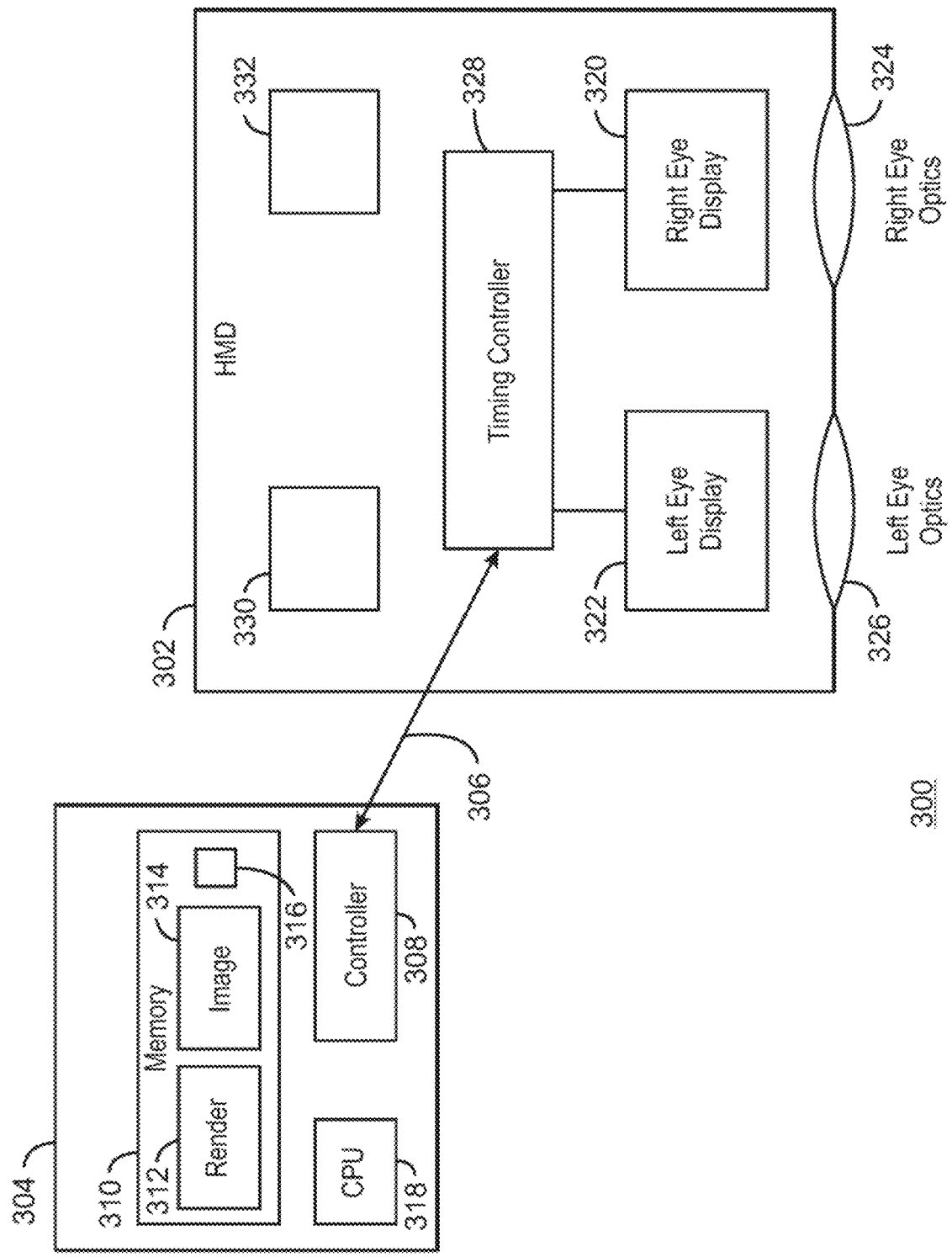
FIG. 3 is a diagram of an HMD system having an HMD and a computing device in accordance with examples.

FIG. 3 is an example of an HMD system 300 including an HMD 302 and a computing device 304. In operation, the HMD 202 may be coupled to the computing device 304 via a link 306. The link 306 may be a wired connection such as a cable or other wired component. In other examples, the link 306 may be a wireless connection such as via Wi-Fi. The link 306 may facilitate communicative coupling of the computing device 304 with the HMD 302, such as in the transfer of image data from the computing device 304 to the HMD 302 for display of the image data at the HMD 302. Further, in some examples, the computing device 304 may provide power to the HMD 302 over the link 306.

In the illustrated example, the computing device 304 has a controller 308 such as a display controller or GPU, or similar controller. In some examples, the controller 308 may include more than one GPU. Further, the computing device 304 typically had one or more additional hardware processors, such as a CPU 318. The CPU 318 may include multiple processors and each processor may have more than one core. The computing device controller 308 (and CPU 318) via render code 312 stored in memory 310 may render images or image data for display on the HMD 302. The memory 310 may store rendered image(s) 314 prior to transfer of the image 314 to the HMD 302. In addition, the memory 310 may store code 316 executed by the controller 308 or CPU 318 to implement the techniques described herein such as with respect to identifying inactive pixels and transferring the image 314 to the HMD 302 without the inactive pixel data. The memory 208 in the computing device 204 may include non-volatile memory, volatile memory, and other types of memory.

The HMO 302 may include a right-eye display 320 and left-eye display 322. In other examples, the HMD 302 may include a single display. Further, the HMD may include right-eye optics 324 and left-eye optics 326 corresponding to the respective displays 320 and 322. The optics 324 and 326 may include lenses, mirrors, and other optics. Moreover, the HMD 302 may include a processor or controller such as a HMD timing controller 328 in the illustrated example. The HMD 302 may include memory 330 and, in some examples, may have one or more additional processors 332. In operation, the display controller 308 of the computing device 304 may direct or otherwise communicate with the HMD timing controller 328.

Figure 4:
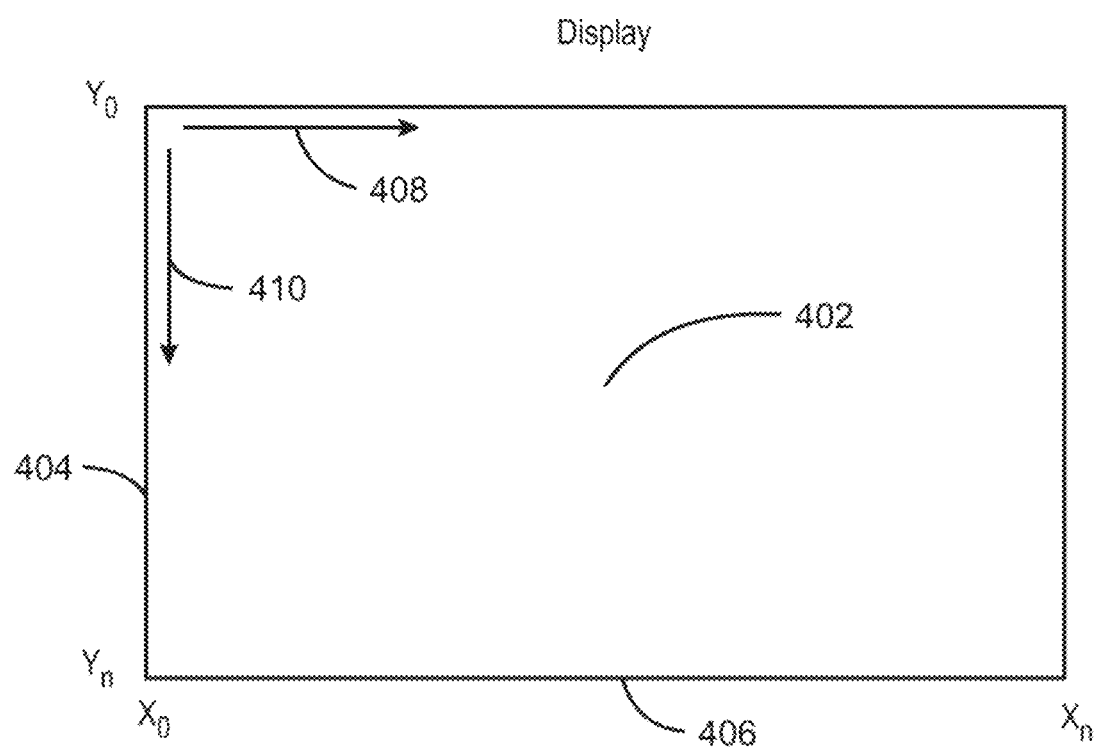
FIG. 4 is diagram of an HMD display in accordance with examples.

FIG. 4 is an example of an HMD display 400 such as the display 320 or display 322 of FIG. 3. The display 400 has a display screen 402. The display 400 may be a CRT, LCD, OLED, and the like. As discussed below, the display 400 may be characterized has having rows 404 from Y0, Y1, Y2 . . . YN and columns 406 from X0, X1, X2 . . . XN. In one example, the display 400 has 1200 columns 406 and 1080 rows 404. In the transfer of image data from a rendering computing device such as the computing device 304 of FIG. 3, serialized data may be transferred by row (arrow 408) and column (arrow 410).

With respect to FIG. 3 and FIG. 4, some components of a HMD 302 and associated computing device 304 are depicted. The displays 320, 322, 400 may be separate for left and right eyes, or be a common physical display assembly attached to the left and right eyepieces, and so on. In either case, the eyepieces may employ optical lens 324, 326 to focus the display 320, 322, 400 to the eye and magnify the field of view given the user.

In operation, the computing device 304 may render left and right images, whether still pictures, video, or three-dimensional (3D) rendering, and the like. The resultant images 314 (e.g., stereo left and right eye images) may be stored in memory 310. For transfer, the display controller 308 may serialize the data of the image 314 to an external stereo display such as the HMD display 320 or 322. The transport or the link 306 for pixel data from the computer 304 and the HMD 302 may typically be a cable (e.g., high-definition multimedia interface or HDMI, DisplayPort or DP, etc.) or a wireless connection. Example user distances from the computer 304 to the HMD 302 may range from 2 meters to 5 meters, or other ranges.

At the HMD 302, the serialized pixel data may be received by the timing controller 328 in the HMD 302, where the serialized data in some examples may then be transferred by row and column to display 320, 322, 400 (e.g., rectangular displays) of the HMD 302. In certain examples, a "vertical sync" initiates the transfer of the graphics data at row Y0 and column X0, causing data to transfer sequentially at column X1, X2, X3 . . . until the final column, Xn. Also, a "horizontal sync" command may reset the column to X0, increment the row to Y1, and the second line is drawn. This sequential transfer may continue, for example, at 1200 columns and 1080 rows per eye, until an image is finished at Xn/Yn. Other quantities of columns and rows are applicable. The computer 304 may substantially continuously update the image, for instance, at the rate of 90 or 120 frames per second (FPS) from the host computer 304. Other values for frame rate or FPS may be accommodated. The displays 320, 322, 400 may convert the data signal to visible light. Examples of display 320, 322, 400 types include LCD or OLED that employ a thin film transistor (TFT) drive for each pixel, and other types of displays. In some instances, the luminance for each pixel may be stored as a voltage at the gate of each pixel's TFT, and may be volatile storage.

The bandwidth on the link 306 (e.g., cable) may be the product of the pixel count, the color depth, and the frame rate. For some HMD examples, this data bandwidth is approximately at least 20 gigabits per second. Supporting this bandwidth at "room scale" (e.g., 5 meter) distance generally employs significant power that may adversely affect thermal performance of the HMD, cost of the connection, or leads to compromise of the image quality due to compression or reduced frame rate, and so forth. The efficiency may be compromised for HMDs that use software IPD, or for systems where HMD optical correction is performed at the computer, and other instances. Both software IPD and optical correction typically causes inactive pixels (e.g., pixels outside the image of interest) to be transported over the cable or wireless interface.

Indeed, inactive pixels may be a consequence of HMD IPD adjustment in software. To further explain, stereoscopic displays generally render a separate image for each eye. The computer graphics controller may render the scene from the viewpoint of each eye. The physical eye separation may be called the IPD which can range, for example, from 52 millimeters (mm) to 78 mm typically for adults, or other ranges. Accurate rendering of this horizontal offset may be beneficial for the HMD to feel natural to the user.

To accommodate the user's natural IPD, HMD may either employ a mechanical adjustment (e.g., a physical adjustment of the location of the displays, such as used by binoculars) or employ a software adjustment. Software adjustable IPD generally utilizes a mechanically static location of the physical display. To accommodate the user's IPD, the position of the active image on the display of the HMD may be altered. In other words, a subset of the displayed image may be windowed on the fixed physical display. In software-adjustable IPD, the computer renderer may position horizontally the left eye image and the right eye image on the respective physical display, and adjust that position as a function of the IPD of the user. In certain examples, the computer renderer may direct a timing controller of the HMD in the positioning of the image on the display.

Figure 5:
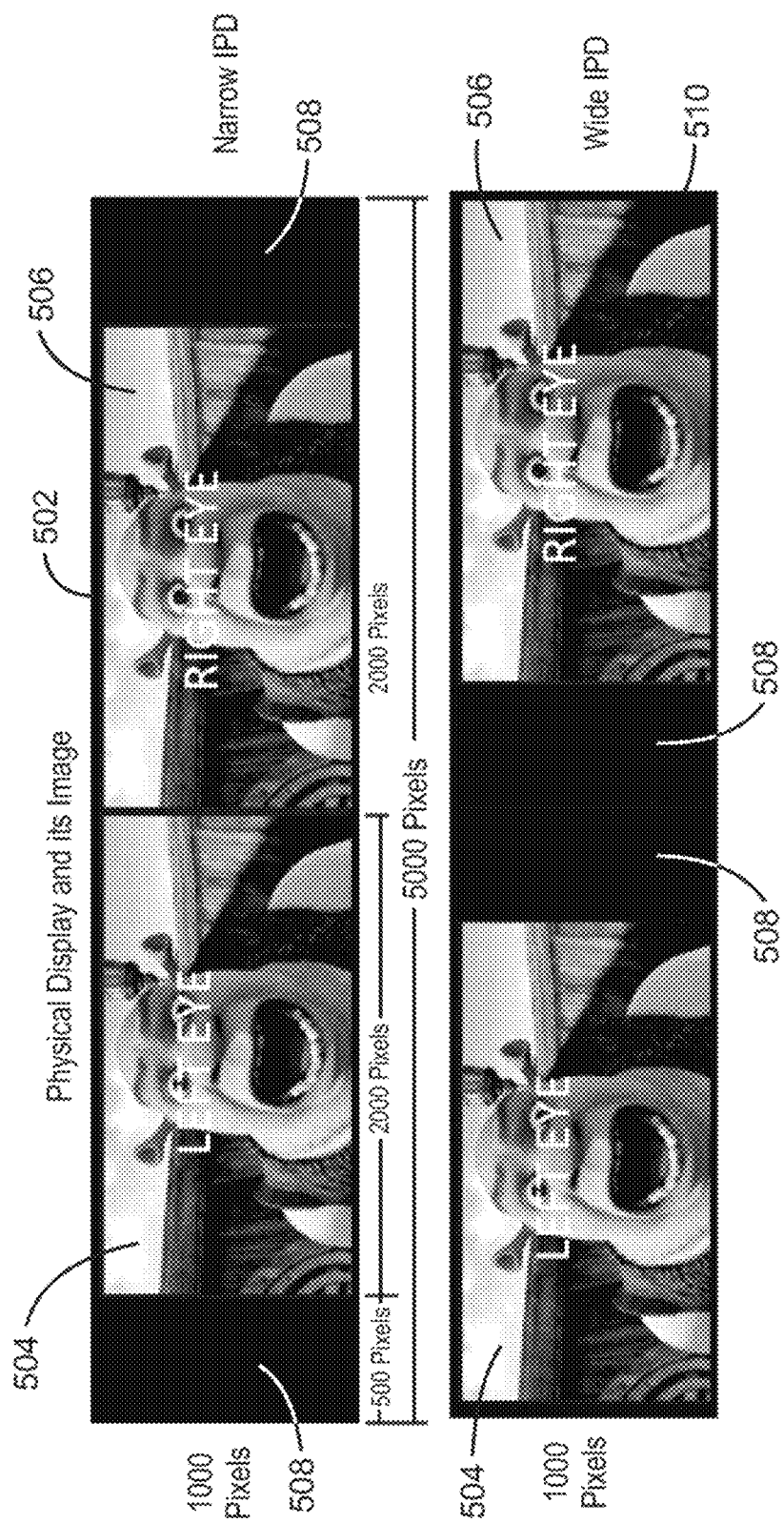
FIG. 5 is diagram of HMD displays in accordance with examples.

FIG. 5 is a diagram 500 of HMD displays 502, and in which inactive pixel data as the blanking position may be sent to the HMD 502. The displays 502 are depicted with the images adjustably positioned via software for a narrow IPD and a wide IPD, respectively as noted. For a narrow IPD, a right-eye image 502 on an HMD right-eye display is positioned adjacent to the left-eye image 504 on the HMD left-eye display. For the narrow IPD, the software implements blanking positioning 508 (inactive pixel data) are the far ends of the displays, as depicted. In contrast, for a wide IPD, the right-eye image 502 on an HMD right-eye display is positioned away from the left-eye image 504 on the HMD left-eye display. For the wide IPD, the software implements blanking positioning 508 (inactive pixel data) on the displays between the images, as shown. It should be noted for a medium IPD (not shown), the blanking positioning 508 may be shared both at the far ends of the displays and also between the images.

In the illustrated example, the displays are each 1000 pixels in height and 2500 pixels in length. In the horizontal direction, the blanking positioning 508 is each 500 pixels in length. The viewable images are each 2000 pixels in length in the horizontal direction. Therefore, in this example, the blanking position 508 (inactive pixels) is 20% of the image data, and the viewable image is 80% of the image data. Thus, transfer of the blanking position 508 from a rendering computing device to the HMD may consume additional bandwidth across the link dues to the transfer of inactive pixels (e.g., 15%, 20%, 25%, etc. of the image data). Such may be reduced or avoided with other examples herein. On the other hand, some examples may tolerate the transfer of these inactive pixels but, for example, reduce the transfer of inactive pixels outside a boundary of a stencil mesh, as discussed below. Furthermore, reducing or avoiding transfer of inactive pixels of both the blanking position 508 and outside of a boundary of a stencil mesh may be implemented in combination.

Figure 6:
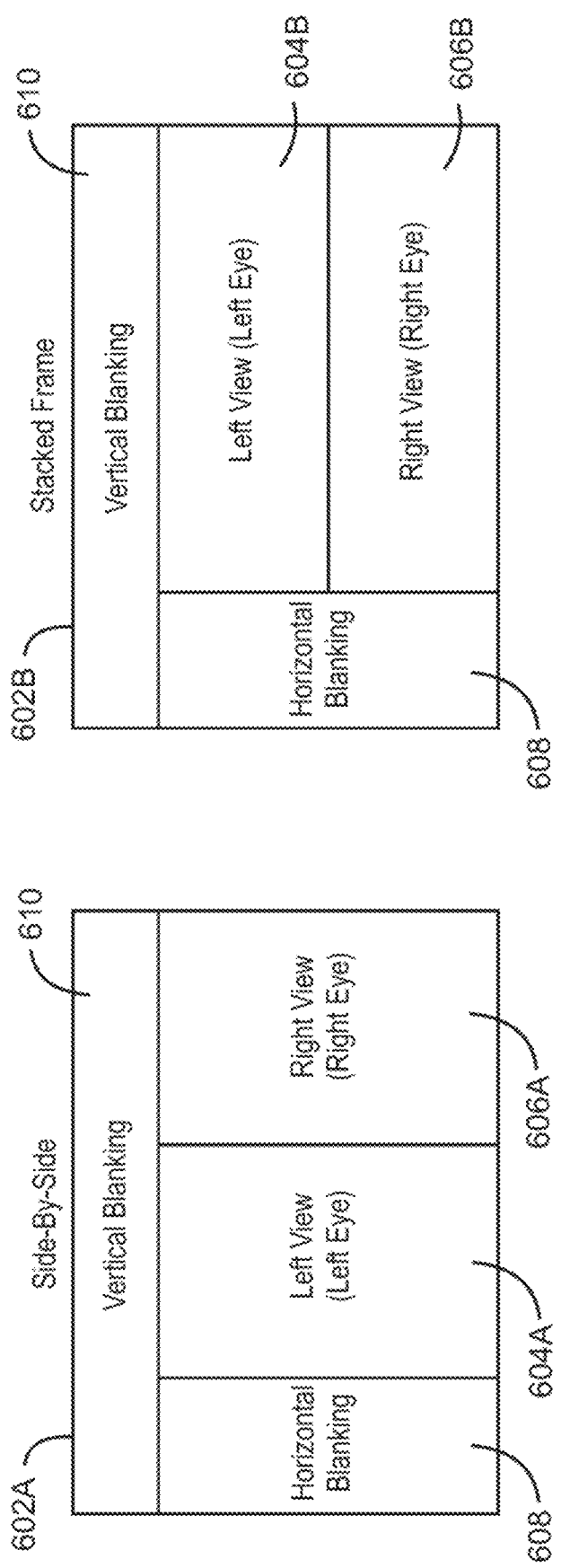
FIG. 6 is a diagram representing transfer of pixel or image data from a computing device to an HMD.

FIG. 6 is a diagram 600 representing transfer of pixel or image data including blanking positions from a computing device to an HMD. The physical transport of the video data (e.g., across an HDMI, DP, etc.) interface may be implemented. Depicted are a first representation 602A which is a side-by-side frame transfer, and a second representation 602B which is a stacked frame transfer. Indeed, formats for the transfer may be "side-by-side or "stacked" configuration, and other formats. The side-by-side format 602A may be commonly employed, for example, with the physical display as a single piece of glass used for both eyes. Conversely, stacked frames format 6028 may be employed, for instance, when each eye views a separate lens and physical display. Other arrangements and configurations are applicable.

For the side-by-side format 602A, the left view (left eye) Image frame 604A and the right view (right eye) image frame 606A are transferred. For the stacked frame format 602, the left view (left eye) image frame 604B and the right view (right eye) image frame 606 are transferred as stacked. In each format, a horizontal blanking 608 and a vertical blanking 610 are transferred.

Thus, with either format, a practice may be a windowed" image to leave a large "porch" of empty pixels or inactive pixels (depicted as black outside the view of interest). In the illustrated example, the viewable image is 1000×2000 pixels on a 2" physical display. Allowing for +/−10 mm IPD gives about 500 pixels in horizontal adjustment for either image, increasing the total amount of data sent over the display cable by 25% (1000 pixels used for blank horizontal positioning when only 4000 pixels contain viewable data). This overhead may be physically limiting, and costly in terms of the power used to transfer the data and the overhead to facilitate speed across the link or cable.

In contrast, as explained below with respect to FIG. 7, to avoid transfer of the blanking positioning or inactive pixel data associated with software adjustable IPD, an offset of the viewable image may be implemented via, for example, in the timing controller of the display in the HMD, such that the blank positioning is reduced or avoided. In particular, the render display controller may, for example, implement the column offset to the HMD (e.g., to the HMD timing controller) before sending viewable data. In response, the timing controller in the HMD may position the active area to narrow or wide (or medium, etc.). As an alternative, the HMD communicates the desired IPD to the display controller but, for instance, controls the offset of the left and right offset. Other similar options are applicable.

Figure 7:
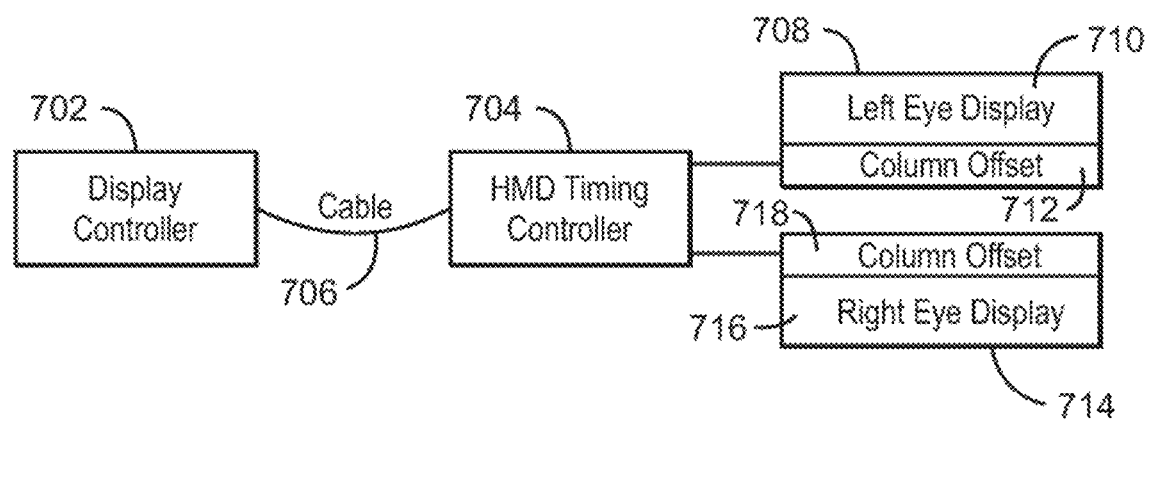
FIG. 7 is a diagram of components of an HMD system including a display controller of a rendering computing device, and an HMD timing controller in accordance with examples.

FIG. 7 are components of an HMD system 700 including a display controller 702 of a rendering computing device (e.g., 104, 204, 304), and an HMD timing controller 704 of the HMD (e.g., 102, 202, 302). The computing device and its display controller 702 may be coupled to the HMD via a cable 706. The HMD further includes displays (not shown) including a left-eye display and a right-eye display.

The illustration of HMD system 700 in operation depicts a representation 708 of image data 710 (active pixels) and a column offset 712 for the left-eye display, and a representation 714 of image data 716 and with a column offset 718 for the right-eye display. Thus, in contrast to FIG. 5 and FIG. 6, this active positioning of the image data via the column offset may avoid the transfer of inactive pixel data or the blanking position. The column offset may provide for positioning of the image on the physical display, as depicted, for example, in FIG. 5 but without the transfer of the blanking position pixels. The column offset may be applied in the horizontal direction along the physical display and dependent on the desired IPD such as narrow IPD or wide IPD. In operation, the rendering computing device may determine an IPD configuration for the HMD. The computer may send a control packet to the HMD describing the IPD offset 712 and 718 for the left and right eye, respectively.

The computer renders an image (e.g., via the display controller 702) for each eye that is smaller in the horizontal or x-direction than the physical size of the display 708, 714. The rendering computer transfers the image (e.g., rectangular image) from, for example, a frame buffer of the rendering computer for the left eye and right eye. The HMD (e.g., via the HMD timing controller 704) positions the left-eye image on the left-eye display with the column offset 712 to the left and/or right of the image depending on the desired IPD. Likewise, the HMD positions the right-eye image on the right-eye display with the column offset 712 to the left and/or right of the viewable image depending on the desired IPD.

Thus, certain examples may advantageously reduce the pixel transfer between, for example, a VR render device and the HMD without little or no sacrificing image quality. The cable transfer to a VR HMD with software adjustable IPD may be decreased for the same image. A portion or all of the inactive pixel data of blanking positioning are not transferred.

In sum, examples may decrease the bandwidth employed on the cable for a HMD such as a VR HMD when the HMD uses a software adjustable windowing method of positioning the viewable image horizontally on a display with greater physical resolution. As indicated, IPD may be the measurement of the distance between the centers of the user's eyes. A faithful projection to the users actual eye spacing may be beneficial for a VR experience.

As mentioned, options for displacing the image may be performed by the host, employing blanking positioning. The blanking positioning is a physical time delay of transfer of the viewable image. As mentioned, the delay caused for the blanking period may appear as data which sent from the rendering source to the display. The viewable area is centered or positioned by sending a blanking period on the side(s) of the viewable area. The transfer of the blanking periods is proportionally inefficient to amount of IPD adjustment desired in the HMD.

In contrast, as discussed, some examples herein may instead employ an active technique of repositioning the image horizontally on the display as a function of the desired IPD. In a particular example, the HMD timing controller physically offsets the start column of the viewable image. After configuration, the source (render computer) may send only the viewable image over the cable, and omit sending blank positioning over the cable. Bandwidth consumed is thus reduced for the viewable image. In certain examples, such may beneficially facilitate lighter or longer cables, or better accommodate existing bandwidth of the cable. Moreover, budgets of power for higher modulation and compression across the cable may be reduced. The discussion now turns to examples with optical corrections (e.g., via a stencil mesh) which may lead to inactive pixels, with or without software-adjustable IPD.

Figure 8:
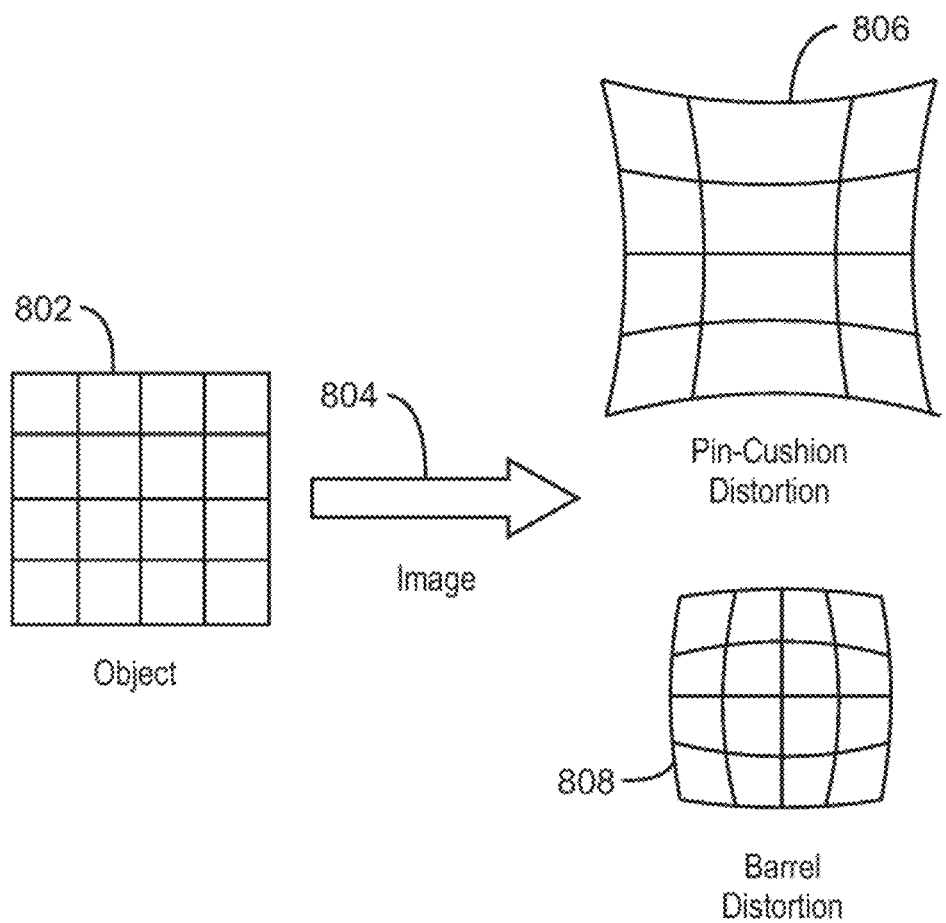
FIG. 8 is a diagram giving example representations of optical distortion and optical correction with respect to an HMD displaying an image of an object in accordance with examples.

FIG. 8 is a diagram 800 giving example representations of optical distortion and optical correction with respect to an HMD displaying an image of an object 802. For some HMDs in the displaying 804 an image of an object 802, the HMD may subject the image to optical distortion (e.g., pin-cushion distortion 806), depending on characteristics of the HMD. In certain examples, the rendering computer associated with the HMD may correct for the optical distortion, such as imposing countervailing distortion to the initial optical distortion. In the illustrated example, the computer imposes a barrel distortion 808 to correct for the HMD distortion.

Thus, reasons for inactive pixels other than IPD adjustment and associated blanking positioning may include the aforementioned optical correction such as with respect to, for example, a stencil mesh. Generally, in HMD (not only those with software adjustable IPD), the optics or lens(es) in the HMD may create significant optical distortion, commonly pin-cushion distortion 806. To correct this geometric distortion, the rendering software in the computer may be configured specifically with the characteristics (e.g., lens characteristics) of the HMD and counters with, for example, a barrel distortion 808 of the image. In certain examples, this rendering correction may be labeled "warping" and transforms the image from rectangular to a round shape. As a round object (e.g., round image) in a square hole (e.g., a rectangular display), this correction may generate significant areas of empty pixels in the corners (and other areas) of the rectangular image container. Also, other implementations of decimating pixels may be utilized to accelerate the software execution. For example, the "hidden area" of sight that is naturally obscured by the nose of the user may be removed from the rendered data for the left eye and right eye.

This "stencil mesh" may represent characteristics of the HMD itself, and distinguishes the boundaries of pixels that could be visible from those that are physically obscured by the HMD display system. To facilitate computing performance, the graphics rendering software may deliberately avoid rendering those areas which are not visible before retiring the result to the graphics display frame buffer. However, though the stencil mesh external areas may be discarded in software to improve efficiency of the render software itself, the transport over the cable may still unfortunately be optimized or configured for the traditional, rectangular display. Serialization process of the memory buffer itself starts and ends with a rectangular format, causing about 20% of the pixels transported to the HMD to be 'inactive' in some examples.

Figure 9:
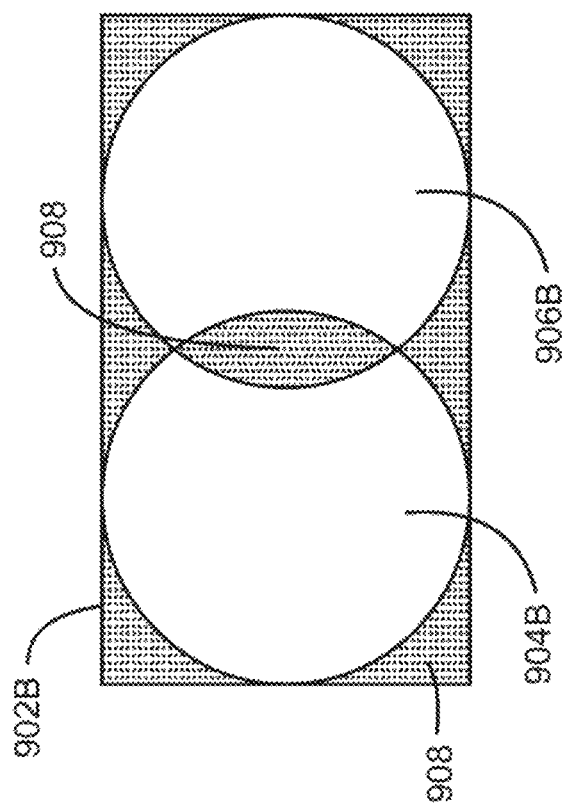
FIG. 9 is a diagram depicting initial images, and images corrected via a stencil mesh in accordance with examples.
Figure 9:
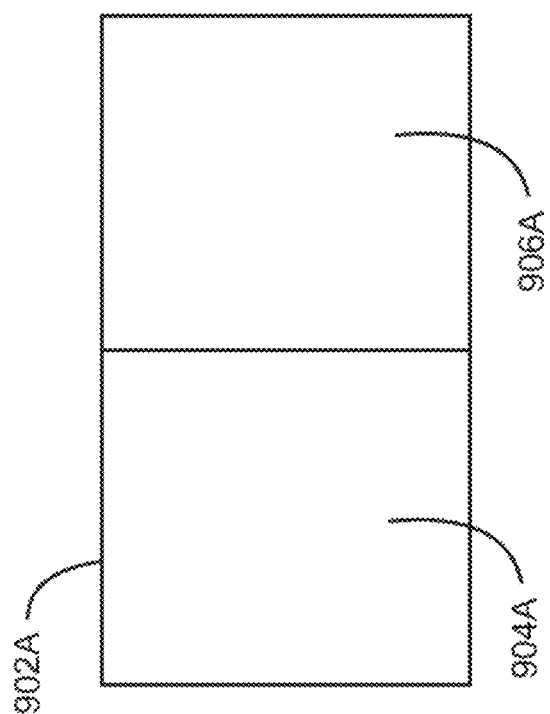

FIG. 9 is a diagram 900 depicting example initial images 902A, and example images 902B corrected via an example stencil mesh. The initial images 902A include a first image 904A for an HMD left-eye display and a second image 906A for an HMD right-eye display. As depicted, the images 904A and 906A are square or rectangular in shape. However, the images may be subjected to optical distortion by the HMD, as discussed above. Further, portions of the images may be obscured from viewing by the user, such as adjacent the nose of the user with the HMD worn by the user and depending on characteristics of the HMD.

Therefore, the images are subjected to optical correction via a stencil mesh to give the images 902B which includes a first image 904B for an HMD left-eye display and a second image 906B for an HMD right-eye display. The portions 908 are outside the viewable area of the images and thus are inactive pixels. The portions 908 include pixels around the edges including in the corners of the displays resulting from optical correction for the HMD distortion. The optical corrections may be render-computer imposition of warping or distortion (e.g., barrel distortion) of the image to correct for an initial distortion of the by the HMD. The initial distortion by the HMD may be due to characteristics of the HMD. In certain examples, this rendering correction may be labeled "warping" The portions 908 also include pixels between the images which may be obscured such as via the nose of the user and for related reasons, and which may be related to physical characteristics of the shape or structure of the HMD.

Figure 10:
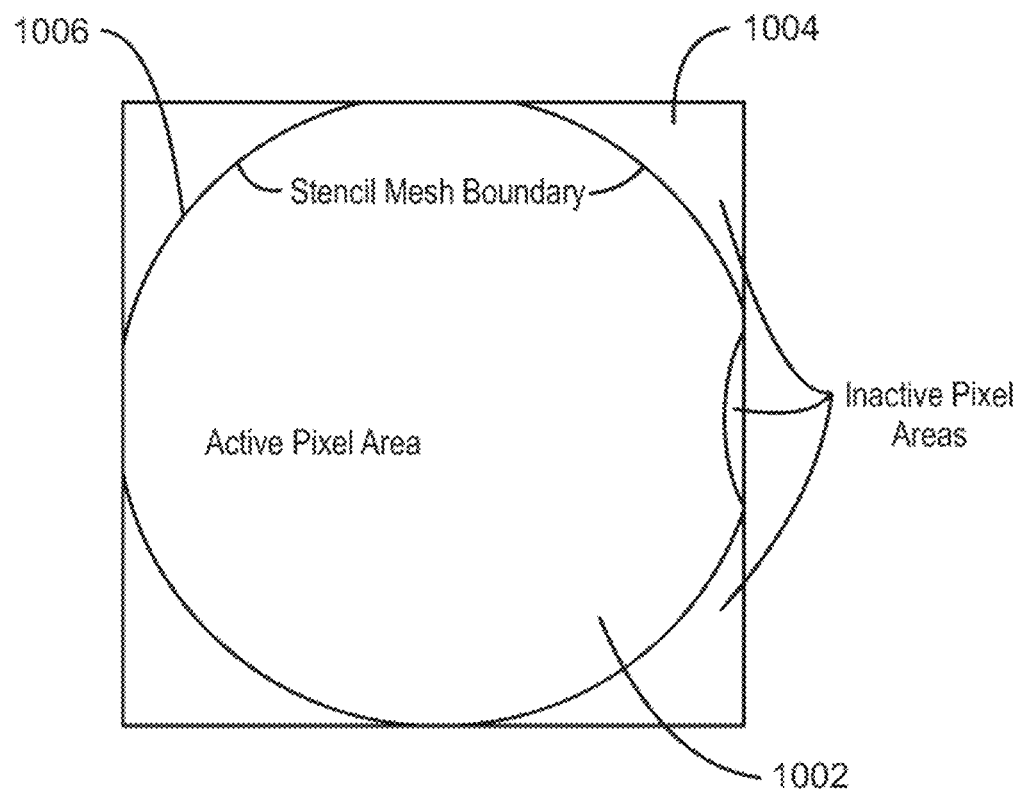
FIG. 10 is a diagram of a stencil mesh applied to an image for display on an HMD in accordance with examples.

FIG. 10 is a diagram 1000 of a stencil mesh applied to an image for display on an HMD. Active pixels (viewable pixels) are inside the boundary 1006 of the stencil mesh. Inactive pixels 1004 are located outside of the boundary 1006 of the stencil mesh. Therefore, in operation of an HMD system, a rendering computing device of the HMD system may generate the stencil mesh based on or as a function of HMD characteristics. Thus, in generating the stencil mesh, the rendering computing device may identify inactive pixels. Again, these inactive pixels (as outside the boundary of the stencil mesh) may be pixels outside of a viewable area of the image. Moreover, to reduce bandwidth consumed across the link or cable between the rendering computing device and the HMD, the rendering computing device may transfer images without these inactive pixels outside the boundary of the stencil mesh.

To identify the inactive pixels 1104, the rendering computer (e.g., having both a graphics display controller and a CPU, as well as memory) may receive and store characteristics of the associated HMD. For example, the rendering computer may receive and store information or data related to optics (e.g., lens) characteristics of the HMD. Such optics features may involve the size, dimensions, materials, transmissive properties, etc. of the optics or lenses, including as related to the distortion (e.g., pin-cushion distortion or other distortion) created or generated, or otherwise imposed, by the HMD optics or lenses on the image. Moreover, the rendering computer may also receive or generate, and save, corrective data or features (e.g., warping or barrel distortion) to be implemented to optically correct for HMD imposed optical distortion. Moreover, the HMD characteristics received and stored by the rendering computer may also include physical dimensions and shape of the HMD that obscure the vision of the image by the user when the HMD is worn by the user. In general, for an HMD, the image may be not viewable at or near, for example, the nose of a user when the HMD is worn or positioned by the user for viewing of the image on the HMD displays.

The rendering computer may employ these various HMD characteristics and render computer-implemented characteristics, including those related to optics and structure, to identify inactive pixels. In other words, based on these HMD characteristics and any corrective features, the rendering computer calculates or otherwise determines one or more stencil meshes for a particular HMD or for types or a family of HMDs. The calculations or determinations by the rendering computing may include to calculate or determine the boundary or boundaries of the stencil mesh.

Figure 11:
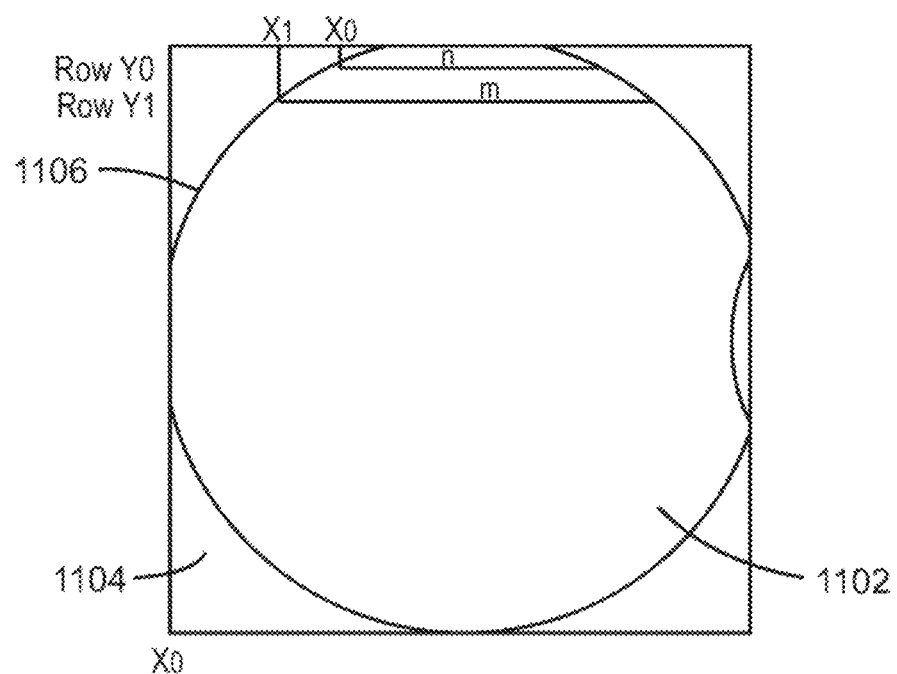
FIG. 11 is a diagram representing the serial transfer of active pixels of image data from a rendering computer to an HMD per a stencil mesh in accordance with examples.

FIG. 11 is a diagram 1100 representing the serial transfer of active pixels of image data from a rendering computer to an HMD per a stencil mesh. Inactive pixel data are not transferred. In particular, inactive pixels 1104 outside of the boundary 1106 of the stencil mesh are not transferred. Active pixels 1102 inside the boundary 1106 of the stencil mesh are transferred. Therefore, the amount of image data for transfer of the image is beneficially reduced. In certain examples, the transfer may involve a graphics controller of the rendering computing device that transfers the image data, and an HMD timing controller of the HMD that receives the image data for display of the image.

Initially, the rendering computing device may identify characteristics of the HMD and establish a stencil mesh boundary 1106 in two-dimensional (2D) format, distinguishing active pixels 1102 and inactive pixels 1104. The computer system may render a graphics frame. In response, the HMD timing controller may set to row Y0, column X0, such as with respect a vertical sync and horizontal sync. The graphics controller identifies the starting column (X axis) of the stencil mesh boundary 1106. The graphics controller sends a control packet to the HMD identifying the start column of the active line HMD. The HMD initializes the line buffer (column data of the first row) to a known state (e.g., pixels in that row to OFF). The graphics controller retrieves the active pixel data sequentially from the row in a frame buffer and transfers across the link (e.g., cable) to the sink (HMD). The amount of data may be associated to the width of the active line. The HMD writes the serial data starting at the "start column" into row 0 of the display, across the active area communicated in the control data packet across the number of pixels received. The graphics controller performs a "horizontal sync" signal, incrementing the read pointer in the graphics frame buffer to the next row (Y+1). The HMD stops writing to the line. The implementation is repeated with updated start column appropriate for the new row until most or all rows (from Y0 to Yn) are transferred. The HMD proceeds to write remaining rows of the display.

Figure 12:
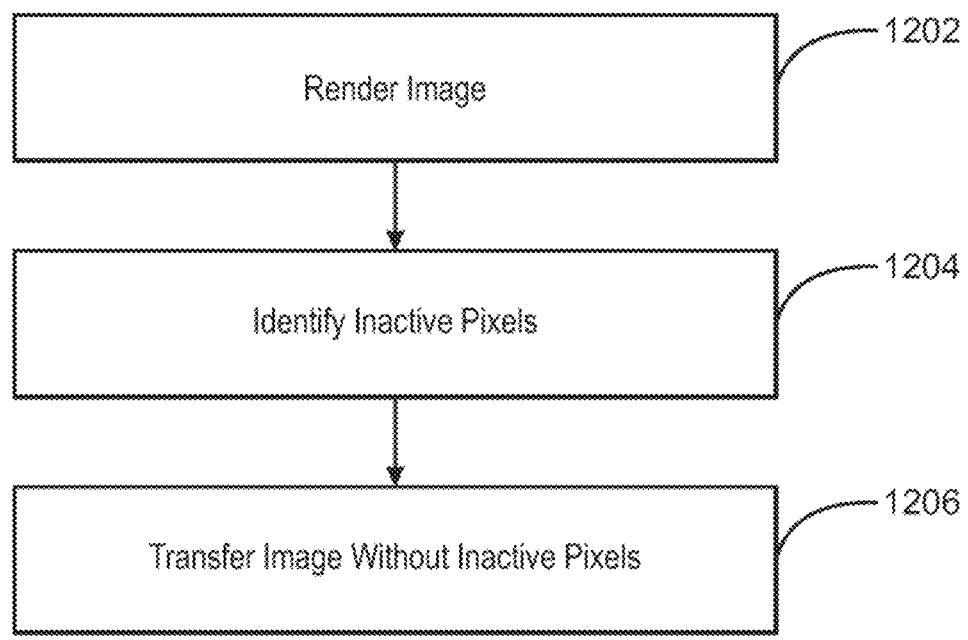
FIG. 12 is a block flow diagram of a method of operating an HMD system having a computing device communicatively coupled to an HMD in accordance with examples.

FIG. 12 is a method 1200 of operating an HMD system having a computing device communicatively coupled to an HMD. The method involves the transfer of an image from the computing device to the HMD without inactive pixel data. At block 1202, the method includes rendering, via the computing device, an image for the HMD. At block 1204, the method includes identifying inactive pixels of the image, the inactive pixels including pixels outside of a viewable area of the image. The inactive pixels may be a blanking position associated with adjustment for IPD of a user of the HMD. Further, the inactive pixels be pixels outside a boundary of a stencil mesh associated with the HMD.

At block 1206, the method includes transferring the image without the inactive pixels from the computing device to the HMD. The transferring may involve transferring the image without the inactive pixels over a wired connection or wireless connection from the computing device to the HMD. For instances with software adjustments for IPD, the method may reposition the image on a display of the HMD as a function of specified IPD, wherein transferring the image without the inactive pixels includes omitting the blanking position. The repositioning may involve repositioning the image horizontally on the display of the HMD. Thus, transferring of the image may be transferring a viewable image, and wherein repositioning includes offsetting a start column of the viewable image on the display. For instances in which a stencil mesh is employed, the transferring of the image without the inactive pixels may include transferring pixels inside the boundary of the stencil mesh and not outside the boundary of the stencil mesh. The transferring of active pixel data inside the boundary may be sequentially per row.

Figure 13:
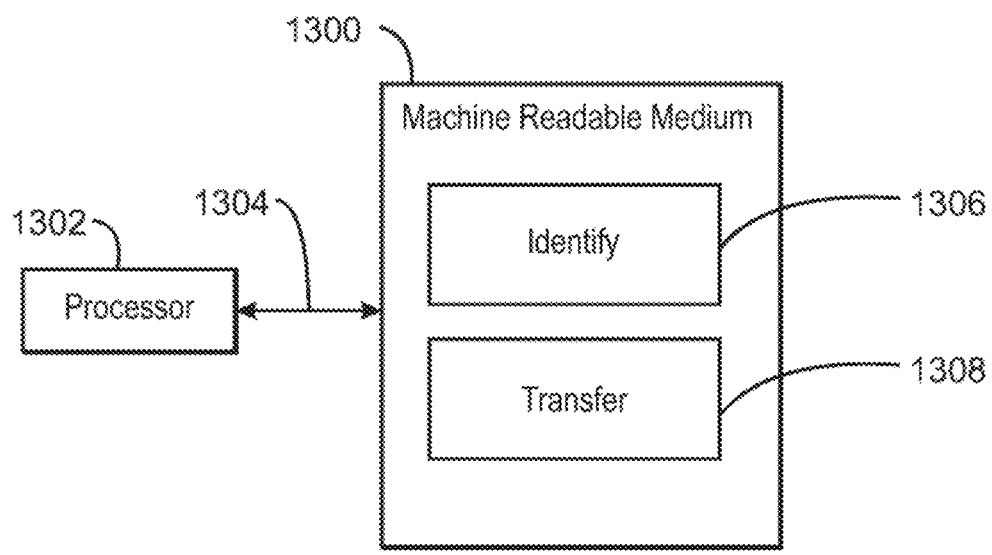
FIG. 13 is a block diagram depicting a tangible, non-transitory, computer-readable medium to facilitate HMD system operation in accordance with examples.

FIG. 13 is a block diagram depicting a tangible, non-transitory, computer-readable medium 1300 to facilitate HMD system operation, as discussed herein. The computer-readable medium 1300 may be accessed by a processor 1302 over a computer interconnect 1304. The processor 1302 may be a processor of rendering computing device or HMD. The tangible, non-transitory, computer-readable medium 1300 may include executable instructions or code to direct the processor 1302 or rendering computing system (and/or HMD) to perform the techniques described herein, such as to identify inactive pixel data of image, and to transfer the image data from the rendering computing device to the HMD without the inactive pixel data.

The various software components discussed herein may be stored on the tangible, non-transitory, computer-readable medium 1300, as indicated FIG. 13. For example, identify code 1306 (executable code/instructions) when executed by the processor 1302 may direct the processor 1302 to identify inactive pixels of an image, such as with respect to IPD adjustment, optical correction including a stencil mesh, and so on. In addition, transfer code 1308 may provide for transfer of the image without the inactive pixels. In some example, a serial data transfer is employed. It should be understood that any number of additional software components not shown in FIG. 13 may be included within the tangible, non-transitory, computer-readable medium 1300, depending on the application.

In some examples, code 1306 and 1308 executed by a processor 1302 may direct a computing device of an HMD system to identify inactive pixels of an image for a head mounted display (HMD), the inactive pixels including pixels outside of a viewable area of the image, and transfer the image without the inactive pixels to the HMD. The inactive pixels comprise a blanking position associated with adjustment for IPD of a user of the HMD. The inactive pixels may include pixels outside a boundary of a stencil mesh associated with the HMD.

In sum, an example includes an HMD system having a computing device to render an image for an HMD and transfer the image to the HMD without inactive pixels of the image, the inactive pixels including pixels outside of a viewable area of the image. The HMD system includes the HMD communicatively coupled to the rendering computing device. The inactive pixels may include a blanking position associated with adjustment for IPD of a user of the HMD, wherein the HMD system to reposition the image horizontally on a display of the HMD as a function of specified IPD, and wherein to transfer the image without the inactive pixels includes to omit at least a portion of the blanking position. The inactive pixels may include pixels outside a boundary of a stencil mesh associated with the HMD, and wherein to transfer the image may include to transfer pixels (e.g., active pixels) inside the boundary of the stencil mesh. In some examples, the active pixel data is transferred sequentially per row of the HMD display.

While the present techniques may be susceptible to various modifications and alternative forms, the examples discussed above have been shown by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method of operating a head mounted display (HMD) system, comprising:
   rendering, via a computing device, an image for the HMD;
   identifying, via the computing device, first inactive pixels of the image, the first inactive pixels comprising pixels outside of a viewable area of the image, the viewable area defined by a boundary of a stencil mesh; and
   transferring the image without the first inactive pixels and with second inactive pixels within the viewable area from the computing device to the HMD, the second inactive pixels corresponding to a blanking position associated with adjustment for interpupillary distance (IPD) of a user of the HMD.

2. The method of claim 1, comprising repositioning the image on a display of the HMD as a function of specified IPD, wherein transferring the image without the first inactive pixels and with the second inactive pixels comprises transferring a viewable image and omitting the blanking position, and wherein repositioning comprises offsetting a start column of the viewable image on the display.

3. The method of claim 2, wherein transferring comprises transferring the image without the first inactive pixels and with the second inactive pixels over a wired connection or wireless connection from the computing device to the HMD, and wherein repositioning comprises repositioning the image horizontally on a display of the HMD.

4. The method of claim 1, wherein transferring comprises transferring active pixel data inside the boundary sequentially per row.

5. A head mounted display (HMD) system comprising:
   a computing device to:
      render an image for an HMD, wherein the computing device comprises a graphics processor to render the image;
      identify first inactive pixels of the image, the first inactive pixels comprising pixels outside of a viewable area of the image defined by a stencil mesh boundary; and transfer the image via a link to the HMD without the first inactive pixels and with second inactive pixels within the stencil mesh boundary, the second inactive pixels corresponding to a blanking position associated with adjustment for interpupillary distance (IPD) of a user of the HMD; and the HMD communicatively coupled via the link to the rendering computing device.

6. The HMD system of claim 5, wherein the computing device comprises memory to store the image, wherein the HMD system is to reposition the image horizontally on a display of the HMD as a function of specified IPD, and wherein to transfer the image without the first inactive pixels comprises to omit at least a portion of the blanking position.

7. The HMD system of claim 5, wherein to identify first inactive pixels of the image comprises to determine a stencil mesh associated with the HMD, the stencil mesh correlative with characteristics of the HMD, and wherein the first inactive pixels comprise pixels outside a boundary of the stencil mesh.

8. The HMD system of claim 7, wherein to transfer the image comprises to transfer pixels inside the boundary of the stencil mesh comprising to transfer active pixel data sequentially per row.

9. The HMD system of claim 5, wherein the computing device comprises a central processing unit (CPU), and wherein the link comprises a wired coupling.

10. A tangible, non-transitory, computer-readable medium comprising code executable by a computing device to direct the computing device to:

identify first inactive pixels of an image for a head mounted display (HMD), the first inactive pixels comprising pixels outside of a viewable area of the image defined by a stencil mesh boundary; and transfer the image without the first inactive pixels and with second inactive pixels within the stencil mesh boundary to the HMD, the second inactive pixels relating to a blanking position associated with adjustment for interpupillary distance (IPD) of a user of the HMD.

* * * * *